US009457496B2

(12) United States Patent
Sun et al.

(10) Patent No.: US 9,457,496 B2
(45) Date of Patent: Oct. 4, 2016

(54) AROMATIC POLYAMIDE FILMS FOR TRANSPARENT FLEXIBLE SUBSTRATES

(75) Inventors: Limin Sun, Copley, OH (US); Frank W. Harris, Boca Raton, FL (US); Jiaokai Jing, Uniontown, OH (US); Haci B. Erdem, Akron, OH (US); John D. Harvey, Seville, OH (US); Dong Zhang, Uniontown, OH (US)

(73) Assignee: Akron Polymer Systems, Inc., Akron, OH (US)

(*) Notice: Subject to any disclaimer, the term of this patent is extended or adjusted under 35 U.S.C. 154(b) by 176 days.

(21) Appl. No.: 13/172,564

(22) Filed: Jun. 29, 2011

(65) Prior Publication Data

US 2012/0244330 A1 Sep. 27, 2012

Related U.S. Application Data

(60) Provisional application No. 61/466,751, filed on Mar. 23, 2011.

(51) Int. Cl.

| C08G 69/32 | (2006.01) |
|---|---|
| B32B 27/34 | (2006.01) |
| B29C 41/24 | (2006.01) |
| C08J 5/18 | (2006.01) |
| C09D 177/10 | (2006.01) |
| B29K 77/00 | (2006.01) |

(52) U.S. Cl.
CPC .............. B29C 41/24 (2013.01); C08G 69/32 (2013.01); C08J 5/18 (2013.01); C09D 177/10 (2013.01); *B29K 2077/00* (2013.01); *B29K 2995/0026* (2013.01); *B32B 27/34* (2013.01); *C08J 2377/10* (2013.01); *Y10T 428/24975* (2015.01); *Y10T 428/265* (2015.01)

(58) Field of Classification Search
CPC .............. B29C 41/24; B29K 2077/00; B29K 2995/0026; B32B 27/34; C08G 69/32; C08J 5/18; C08J 2377/10; C09D 177/10; Y10T 428/265; Y10T 428/24975
See application file for complete search history.

(56) References Cited

U.S. PATENT DOCUMENTS

| 3,386,965 A | * | 6/1968 | Huffman et al. ............. 528/331 |
|---|---|---|---|
| 4,461,886 A | | 7/1984 | Rogers et al. |
| 5,026,819 A | * | 6/1991 | Irwin ..................... 528/329.1 |
| 5,039,785 A | * | 8/1991 | Irwin ........................ 528/315 |
| 5,160,619 A | | 11/1992 | Yamaguchi et al. |
| 5,189,141 A | * | 2/1993 | Irwin ........................ 528/331 |
| 5,189,538 A | | 2/1993 | Arakawa |
| 5,212,258 A | * | 5/1993 | Irwin ........................ 525/432 |
| 5,290,887 A | | 3/1994 | Hefner et al. |
| 5,292,856 A | * | 3/1994 | Irwin ........................ 528/331 |
| 5,387,657 A | | 2/1995 | Hefner et al. |
| 5,396,355 A | | 3/1995 | Wada et al. |
| 5,427,712 A | | 6/1995 | Nakamura et al. |
| 5,529,818 A | | 6/1996 | Tsuda et al. |
| 5,532,322 A | | 7/1996 | Kadono et al. |
| 5,580,950 A | | 12/1996 | Harris et al. |
| 5,677,390 A | | 10/1997 | Dadgar et al. |
| 5,698,676 A | | 12/1997 | Dhaon |
| 6,115,095 A | | 9/2000 | Suzuki et al. |
| 6,175,400 B1 | | 1/2001 | Duncan et al. |
| 6,881,454 B2 | | 4/2005 | Taguchi |
| 7,037,443 B2 | | 5/2006 | Shuto et al. |
| 7,061,081 B2 | | 6/2006 | Yano et al. |
| 7,135,211 B2 | | 11/2006 | Shuto et al. |
| 7,227,602 B2 | | 6/2007 | Jeon et al. |
| 7,236,221 B2 | | 6/2007 | Ishikawa et al. |
| 8,664,335 B2 | | 3/2014 | Koros et al. |
| 2002/0041352 A1 | | 4/2002 | Kazuhara et al. |
| 2004/0051831 A1 | | 3/2004 | Su Yu et al. |
| 2005/0057714 A1 | | 3/2005 | Jeon et al. |
| 2005/0105027 A1 | | 5/2005 | Wada et al. |
| 2005/0200792 A1 | | 9/2005 | Jeon et al. |
| 2005/0270458 A1 | | 12/2005 | Ishikawa et al. |
| 2006/0062935 A1 | | 3/2006 | Murakami |
| 2006/0106193 A1 | | 5/2006 | Toray |

(Continued)

FOREIGN PATENT DOCUMENTS

| CN | 101511938 A | 8/2009 |
|---|---|---|
| EP | 06 103 79 | 7/1998 |

(Continued)

OTHER PUBLICATIONS

José M. García, Félix C. García, Felipe Serna, José L. de la Peña, High-performance aromatic polyamides, Progress in Polymer Science, vol. 35, Issue 5, May 2010, pp. 623-686, ISSN 0079-6700, http://dx.doi.org/10.1016/j.progpolymsci.2009.09.002.*
Zhang, D., et al., "Mesogen-Jacketed Liquid Crystal Polymers with Mesogens of Aromatic Amide Structure" Polymers for Advanced Technologies, Wiley & Sons, Bognor Regis, GB, vol. 18, No. 4, Apr. 1, 1997, pp. 227-233, XP000691535.
Zhang, et al., "Synthesis of a New Side-Chain Type Liquid Crystal Polymer Poly[dicyclohexyl vinylterephtalate]" Macromolecules, ACS, Washington, DC, U.S., vol. 32, Jan. 1, 1999, pp. 4494-4496, XP002495422, ISSN: 0024-9297.
Zhao, et al., Synthesis and Characterization of Diblock Copolymers Based on Crystallizable Poly(e-caprolactone) and Mesogen-Jacketed Liquid Crystalline Polymer Block: Polymer, Elsevier Science Publishers B.V., GB, vol. 46, No. 14, Jun. 27, 2005, pp. 5396-5405, XP004924379, ISSN: 0032-3861.
Li, et al., "Hierarchical Assembly of a Series of Rod-Coil Block Copolymers: Supramolecular LC Phase in Nanoenvironment" Macromolecules 2004, vol. 37, No. 8, pp. 2854-2860.
Luo, et al., "Conduction Mechanism in a Novel Oxadiazole Derivative: Effects of Temperature and Hydrostatic Pressure" J. Phys. D: Appl. Phys. vol. 38, 2005, pp. 1132-1135, IOP Publishing Ltd. Printed in the UK.
Ito, H.; Oka, W.; Goto, H.; Umeda, H.; Plastic Substrates for Flexible Displays, JP Journal of Applied Physics, vol. 45, No. 5B, 2006, pp. 4325-4329.

(Continued)

*Primary Examiner* — Callie Shosho
*Assistant Examiner* — John Freeman
(74) *Attorney, Agent, or Firm* — Benesch, Friedlander, Coplan & Aronoff, LLP

(57) ABSTRACT

The present invention is directed toward transparent films prepared from soluble aromatic copolyamides with glass transition temperatures greater than 300 C. The copolyamides, which contain pendant carboxylic groups are solution cast into films using N,N-dimethylacetamide (DMAc), N-methyl-2-pyrrolidinone (NMP), or other polar solvents. The films are thermally cured at temperatures near the copolymer glass transition temperature. After curing, the polymer films display transmittances >80% from 400 to 750 nm, have coefficients of thermal expansion of less than 20 ppm, and are solvent resistant. The films are useful as flexible substrates for microelectronic devices.

22 Claims, No Drawings

(56) References Cited

U.S. PATENT DOCUMENTS

| | | | |
|---|---|---|---|
| 2006/0114383 | A1 | 6/2006 | Kobayashi et al. |
| 2007/0020407 | A1 | 1/2007 | Umemoto et al. |
| 2007/0046870 | A1 | 3/2007 | Murakami et al. |
| 2008/0239491 | A1 | 10/2008 | Zheng et al. |
| 2008/0241565 | A1 | 10/2008 | Germroth et al. |
| 2009/0318660 | A1* | 12/2009 | Bos et al. .................. 528/310 |
| 2011/0034666 | A1 | 2/2011 | Bos et al. |

FOREIGN PATENT DOCUMENTS

| | | |
|---|---|---|
| EP | 1 506 991 | 2/2005 |
| JP | 04 215 602 | 8/1992 |
| JP | 2000 273 168 | 10/2000 |
| JP | 2005206846 | 8/2005 |
| JP | 2007 046 059 | 2/2007 |
| JP | 2007-063417 | 3/2007 |
| JP | 2007-231224 | 9/2007 |
| JP | 2009-067834 | 4/2009 |
| JP | 2009-079210 | 4/2009 |
| TW | I287030 | 1/2006 |
| WO | 2008-044 851 | 4/2008 |
| WO | 2008 121 584 | 10/2008 |
| WO | 2010005734 A1 | 1/2010 |

OTHER PUBLICATIONS

Li, F.; Harris, F.W.; Cheng, S.Z.D.; Polyimide Films as Negative Birefringent Compensators for Normally White Twisted Nematic Liquid Crystal Displays, Polymer vol. 37, No. 23, 1996, pp. 5321-5325.
Matthews, A. S.; Kim, I.; Ha, C.S.; Fully Aliphatic Polyimides From Adamantane-Based Diamines For Enhanced Thermal Stability, Solubility, Transparency, and Low Dielectric Constant, Dept. of Polymer Science and Engineering, Pusan National University, Busan, 2006, pp. 609-735, Korea.
Mehdipour-Antaei, S.; Babanzadeh, S.; New Types of Heat-Resistant, Flame-Retardant Ferrocene-Based Ployamides With Improved Solubility, Iran Polymer and Petrochemical Institute, P.O. Box 14965/115, Tehran, Iran (Available at ScienceDirect, Reactive & Functional Polymers 67, 2007, pp. 883-892.
Liou, G.S.; Hsiao, S.H.; Ishida, M.; Kakimoto, M.; Imai, Y.; Synthesis and Characterization of Novel Soluble Triphenylamine-Containing Aromatic Polyamides Based on N,N'-BIS(4-Aminophenyl)-N,N'-Diphenyl-1,4-Phenylenediamine; Journal of Polymer Science; Part A: Polymer Chemistry, vol. 40, 2002, pp. 2810-2818.
Phillips, R.E.; Soulen, R.L.; Propylene Oxide Addition to Hydrochloric Acid, Journal of Chemical Education, vol. 72, No. 7, Jul. 1995, pp. 624-625.
Seo, K.B.; Jeong, J.K.; Choi, S.J.; Hong, Y.T.; Suh, D.H.; Synthesis and Characterization of Novel Aromatic-Aliphatic Poly(Amide-Imide-Imide)S (PAII), Die Angewandte Makromolekulare Chemic 264, 1999, oo, pp. 30-38, (Mr 4590).
Ebadi, H.; Mehdipour-Ataei, S.; Heat-Resistant, Pyridine-Based Polyamides Containing Ether and Ester Units With Improved Solubility, Chinese Journal of Polymer Science, vol. 28, No. 1, 2010, pp. 29-37.
Mehdipour-Ataei, S.; Hatami M.; Mosslemin, M.H.; Organosoluble, Thermally Stable Polyamides Containing Sulfone and Sulfide Units, Chinese Journal of Polymer Science, vol. 27, No. 6, 2009, pp. 781-787.
Chai, C.; Wang, J.; Fan, X.; Chen, X.; Zhou, Q.; Synthesis and Characterization of Mesogen Jacketed Liquid Crystalline Polymer Containing 1, 3, 4-Oxadiazole, Beijing National Laboratory for Molecular Science, Key Laboratory of Polymer Chemistry and Physics of Ministry of Education College of Chemistry and Molecular Engineering, Peking University, Beijing, 2006, 532-535.
Liu, J.M.; Lee, T.M.; Wen, C.H.; Leu, C.M.; High Performance Organic-Inorganic Hybrid Plastic Substrate for Flexible Display and Electronics, MCL, Industrial Technology Research Institute, Chutung, Hsinchu, 310 Taiwan, ROC, SID 10 Digest, pp. 913-916.
Office Action issued on Aug. 13, 2014 at Taiwan Patent Office, pp. 1-5.
Kratochvil, AM; Koros, WJ, "Decarboxylation-Induced Cross-Linking of a Polyimide for Enhanced CO2 Plasticization Resistance", pp. 7920-7927, Macromolecules, 2008. Amer. Chem. Society.
Chien-Chiang, et al "Plasticization-resistant hollow fiber membranes for CO2/CH4 separation based on a thermally crosslinkable polyimide", pp. 212-221, Journal of Membrane Science 382 (2011).
Chien-Chang, et al. "Characterization of Thermally Cross-Linkable Hollow Fiber Membranes for Natural Gas Separation", pp. 1015-1022, ACS Publications, American Chemical Society (2012).
SIPO of P.R. China—Notification of First Office Action dated Jul. 15, 2015 from CN application No. 201280022302.8, filed Mar. 22, 2012, pp. 1-4.

* cited by examiner

AROMATIC POLYAMIDE FILMS FOR TRANSPARENT FLEXIBLE SUBSTRATES

CROSS-REFERENCE TO RELATED APPLICATION

This application claims priority to a provisional patent application Ser. No. 61/466,751, entitled AROMATIC POLYAMIDE FILMS FOR TRANSPARENT FLEXIBLE SUBSTRATES, filed Mar. 23, 2011, the contents of which are incorporated herein by reference.

FIELD OF THE INVENTION

The invention relates to the manufacture of thermally and dimensionally stable transparent polymer films. More particularly, the invention relates to the manufacture and use of aromatic polyamides, which have a rigid backbone with a glass transition temperature higher than 300° C., yet are still soluble in conventional organic solvents without the need for the presence of inorganic salts. The polymer films can be prepared by solution casting, and cured at elevated temperatures. The cured films show a high optical transparency over a range of 400~750 nm, (transmittance >80%), a low coefficient of thermal expansion (CTE <20 ppm/° C.), and good solvent resistance.

BACKGROUND

Organic Light Emitting Diode (OLED) displays were a $1.25 billion market in 2010, which is projected to grow annually at a rate of 25%. The high efficiency and high contrast ratio of OLED displays make them a suitable replacement for liquid crystal displays (LCDs) in the mobile phone display, digital camera, and global positioning system (GPS) market segments. These applications place a premium on high electrical efficiency, compact size, and robustness. This has increased the demand for active matrix OLEDs (AMOLEDs) which consume less power, have faster response times, and higher resolutions. AMOLED innovations that improve these properties will further accelerate AMOLED adoption into portable devices and expand the range of devices that use them. These performance factors are largely driven by the processing temperature of the electronics. AMOLEDs have a thin-film transistor (TFT) array structure which is deposited on the transparent substrate. Higher TFT deposition temperatures can dramatically improve the electrical efficiency of the display. Currently, glass plates are used as AMOLED substrates. They offer high processing temperatures (>500° C.) and good barrier properties, but are relatively thick, heavy, rigid, and are vulnerable to breaking, which reduces product design freedom and display robustness. Thus, there is a demand by portable device manufacturers for a lighter, thinner, and more robust replacement. Flexible substrate materials would also open new possibilities for product design, and enable lower cost roll-to-roll fabrication.

Many polymer thin films have excellent flexibility, transparency, are relatively inexpensive, and are lightweight. Polymer films are excellent candidates for substrates for flexible electronic devices, including flexible displays and flexible solar cell panels, which are currently under development. Compared to rigid substrates like glass, flexible substrates offer some potentially significant advantages in electronic devices, including:

a. Light weight (glass substrates represent about 98% of the total weight in a thin film solar cell).
  b. Flexible (Easy to handle, low transportation costs, and/or more applications for both raw materials and products.)
  c. Amenable to roll-to-roll manufacturing, which could greatly reduce the manufacturing costs.

To facilitate these inherent advantages of a polymeric substrate for the flexible display application, several issues must be addressed including:

a. Increasing the thermal stability;
  b. Reducing the coefficient of thermal expansion (CTE);
  c. Maintaining high transparency during high temperature processing; and,
  d. Increasing the oxygen and moisture barrier properties. Currently, no pure polymer film can provide sufficient barrier properties. To achieve the target barrier property, an additional barrier layer must be applied.

Several polymer films have been evaluated as transparent flexible substrates, including: polyethylene terephthalate (PET), polyethylene naphthalate (PEN), polycarbonate (PC), polyethersulfone (PES), cyclic olefin polymer (COP), polyarylates (PAR), polyimides (PI), and others. However, no one film can meet all the requirements. Currently, the industrial standard for this application is PEN film, which meets part of the requirements (Transmittance >80% between 400 nm ~750 nm, CTE <20 ppm/° C.), but has a limited use temperature (<200° C.). A transparent polymer film with a higher thermal stability ($T_g$>300° C.) and a lower CTE (<20 ppm/° C.) is desirable.

Conventional aromatic polyimides are well known for their excellent thermal and mechanical properties, but their films, which must be cast from their polyamic acid precursors, are usually dark yellow to orange. Some aromatic polyimides have been prepared that can be solution cast into films that are colorless in the visible region, but such films do not display the required low CTE (For example, F. Li. F. W. Harris, and S. Z. D. Cheng, Polymer, 37, 23, pp 5321 1996). The films are also not solvent resistant. Polyimide films based on part or all alicyclic monomers, such as those described in patents JP 2007-063417 and JP 2007-231224, and publication by A. S. Mathews et al (J. Appl. Polym. Sci., Vol. 102, 3316-3326, 2006), show improved transparency. Although $T_g$s of these polymers can be higher than 300° C., at these temperatures the polymers do not show sufficient thermal stability due to their aliphatic units.

Fiber reinforced polymer composite films, such as reported by H. Ito (Jap. J. Appl. Phys., 45, No. 58, pp 4325, 2006), combine the dimensional stability of fiber glass in a polymer film, offering an alternative way to achieve a low CTE. However, in order to maintain a high transparency, the refractive indices of the matrix polymer and the fiber must be precisely matched, which greatly limits the choice of the matrix polymer within an organic silicon resin. By using nanoparticles as filler, the effect of lowering CTE is not significant (J M Liu, et al, J. SID, Vol. 19, No. 1, 2011)

Although most aromatic polyamides are poorly soluble in organic solvents and cannot be solution cast into films, a few polymers have been prepared that are soluble in polar aprotic solvents containing inorganic salts. Some of these have been investigated for use as flexible substrates. For example, JP 2009-79210A describes a thin film prepared from a fluorine containing aromatic polyamide that displays a very low CTE (<0 ppm/° C.), good transparency (T %>80 between 450~700 nm), and excellent mechanical properties. However, the maximum thickness of films made from this polymer is 20 μm, because a dry-wet method where the salt is removed must be used for the film preparation. Most importantly, the film also displays poor resistance to strong organic solvents.

SUMMARY

The present invention is directed toward transparent films prepared from aromatic copolyamides with $T_g$s greater than 300° C. that have CTEs less than 20 ppm/° C. The films are cast using solutions of the polyamides in N,N-dimethylacetamide (DMAc), N-methyl-2-pyrrolidinone (NMP), or other polar solvents. The present invention can be produced in the absence of an inorganic salt. Surprisingly, it was discovered that the incorporation of a few free, pendant carboxyl groups along the polyamide backbones allowed the films to be thermally cured at elevated temperatures, which greatly increased their solvent resistance.

According to one embodiment of this invention, a process is provided for manufacturing a thermally and dimensionally stable transparent aromatic copolyamide film comprising the steps of: (A) forming a mixture of two or more aromatic diamines wherein at least one of the diamines contains one or more free carboxylic acid groups, such that the amount of the carboxylic acid containing diamine is greater than approximately 1 mole percent and less than approximately 10 mole percent of the total diamine mixture; (B) dissolving the aromatic diamine mixture in a polar solvent; (C) reacting the diamine mixture with at least one aromatic diacid dichloride, wherein hydrochloric acid and a polyamide solution is generated; (D) eliminating the hydrochloric acid with a reagent; (E) casting the polyamide solution into a film; and (F) curing the film at a temperature, wherein the temperature is at least 90% of the glass transition temperature of the film. The curing process involves heating the polymer films containing a free acid group near the $T_g$ for several minutes under an inert atmosphere or under reduced pressure. After the curing process, the film resists dissolution and/or swelling in commonly used organic solvents, including NMP, DMAc, dimethylsulfoxide (DMSO), etc. The word "eliminating" is defined to mean physically trapping, neutralizing, and/or chemically reacting the hydrochloric acid.

According to another embodiment of this invention, a transparent aromatic copolyamide film is produced having at least two repeat units of a general formula (I) and (II):

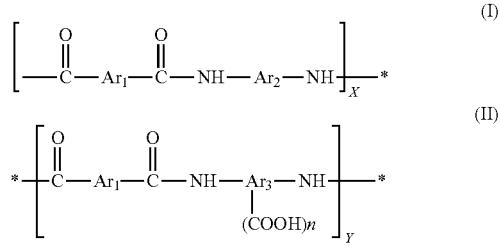

wherein n=1 to 4 (including, without limitation, 1, 2, 3, and 4), wherein $Ar_1$ is selected from the group of aromatic units which form aromatic diacid chlorides:

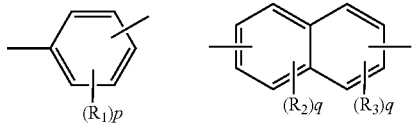

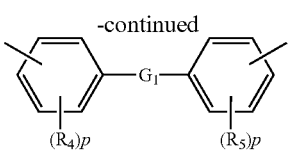

wherein p=4, q=3, and wherein $R_1$, $R_2$, $R_3$, $R_4$, $R_5$ are selected from the group comprising hydrogen, halogen (fluoride, chloride, bromide, and iodide), alkyl, substituted alkyl such as halogenated alkyls, nitro, cyano, thioalkyl, alkoxy, substituted alkoxy such as halogenated alkoxy, aryl, or substituted aryl such as halogenated aryls, alkyl ester and substituted alkyl esters, and combinations thereof. It is to be understood that each $R_1$ can be different, each $R_2$ can be different, each $R_3$ can be different, each $R_4$ can be different, and each $R_5$ can be different. $G_1$ is selected from a group comprising a covalent bond; a $CH_2$ group; a $C(CH_3)_2$ group; a $C(CF_3)_2$ group; a $C(CX_3)_2$ group, wherein X is a halogen; a CO group; an O atom; a S atom; a $SO_2$ group; a Si $(CH_3)_2$ group; 9,9-fluorene group; substituted 9,9-fluorene; and an OZO group, wherein Z is a aryl group or substituted aryl group, such as phenyl group, biphenyl group, perfluorobiphenyl group, 9,9-bisphenylfluorene group, and substituted 9,9-bisphenylfluorene. $Ar_2$ is selected from the group of aromatic units which form diamines:

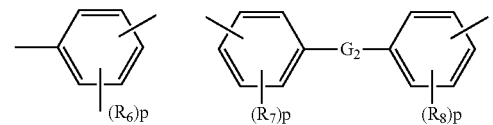

wherein p=4, wherein $R_6$, $R_7$, $R_8$ are selected from the group comprising hydrogen, halogen (fluoride, chloride, bromide, and iodide), alkyl, substituted alkyl such as halogenated alkyls, nitro, cyano, thioalkyl, alkoxy, substituted alkoxy such as halogenated alkoxy, aryl, substituted aryl such as halogenated aryls, alkyl ester, and substituted alkyl esters, and combinations thereof. It is to be understood that each $R_6$ can be different, each $R_7$ can be different, and each $R_8$ can be different. $G_2$ is selected from a group comprising a covalent bond; a $CH_2$ group; a $C(CH_3)_2$ group; a $C(CF_3)_2$ group; a $C(CX_3)_2$ group, wherein X is a halogen; a CO group; an O atom; a S atom; a $SO_2$ group; a Si $(CH_3)_2$ group; 9,9-fluorene group; substituted 9,9-fluorene; and an OZO group, wherein Z is a aryl group or substituted aryl group, such as phenyl group, biphenyl group, perfluorobiphenyl group, 9,9-bisphenylfluorene group, and substituted 9,9-bisphenylfluorene. $Ar_3$ is selected from the group of aromatic units which form diamines containing free carboxylic acid group:

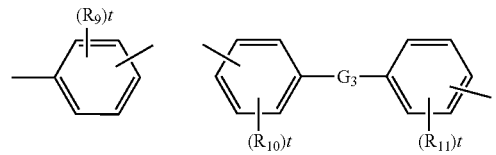

wherein t=1 to 3, wherein $R_9$, $R_{10}$, $R_{11}$ are selected from the group comprising hydrogen, halogen (fluoride, chloride, bromide, and iodide), alkyl, substituted alkyl such as halogenated alkyls like trifluoromethyl, nitro, cyano, thioalkyl, alkoxy, substituted alkoxy such as a halogenated alkoxy, aryl, substituted aryl such as halogenated aryls, alkyl ester, and substituted alkyl esters, and combinations thereof. It is to be understood that each $R_9$ can be different, each $R_{10}$ can be different, and each $R_{11}$ can be different. $G_3$ is selected from a group comprising a covalent bond; a $CH_2$ group; a $C(CH_3)_2$ group; a $C(CF_3)_2$ group; a $C(CX_3)_2$ group, wherein X is a halogen; a CO group; an O atom; a S atom; a $SO_2$ group; a Si $(CH_3)_2$ group; 9,9-fluorene group; substituted 9,9-fluorene; and an OZO group, wherein Z is a aryl group or substituted aryl group, such as phenyl group, biphenyl group, perfluorobiphenyl group, 9,9-bisphenylfluorene group, and substituted 9,9-bisphenylfluorene. It should be understood that the copolymer may contain multiple repeat units with structures (I) and (II) where $Ar_1$, $Ar_2$, and $Ar_3$ may be the same or different.

According to yet another embodiment of this invention, a method of preparing a transparent film having a CTE less than 20 ppm/° C. that is stable for at least one hour at 300° C. comprising the steps of:

(A) reacting a mixture of aromatic diamines, in a polar solvent, wherein at least one of the diamines includes a pendant carboxylic acid group of the general formula (III):

(III)

wherein n=1 to 4 (including, without limitation, 1, 2, 3, and 4), wherein Ar is selected from the group of aromatic units which form diamines containing free carboxylic acid group:

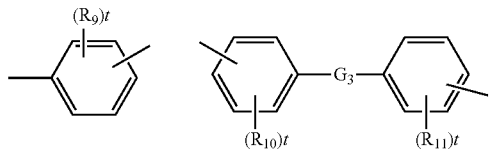

wherein m=1 or 2, wherein t=1 to 3, wherein $R_9$, $R_{10}$, $R_{11}$ are selected from the group comprising hydrogen, halogen (fluoride, chloride, bromide, and iodide), alkyl, substituted alkyl such as halogenated alkyls, nitro, cyano, thioalkyl, alkoxy, substituted alkoxy such as a halogenated alkoxy, aryl, substituted aryl such as halogenated aryls, alkyl ester, and substituted alkyl esters, and combinations thereof. It is to be understood that each $R_9$ can be different, each $R_{10}$ can be different, and each $R_{11}$ can be different. $G_3$ is selected from a group comprising a covalent bond; a $CH_2$ group; a $C(CH_3)_2$ group; a $C(CF_3)_2$ group; a $C(CX_3)_2$ group, wherein X is a halogen; a CO group; an O atom; a S atom; a $SO_2$ group; a Si $(CH_3)_2$ group; 9,9-fluorene group; substituted 9,9-fluorene; and an OZO group, wherein Z is a aryl group or substituted aryl group, such as phenyl group, biphenyl group, perfluorobiphenyl group, 9,9-bisphenylfluorene group, and substituted 9,9-bisphenylfluorene; with aromatic diacid chlorides to afford a copolyamide containing pendant carboxyl groups;

(B) solution casting the resulting copolyamide into a film; and, (C) curing the film to induce solvent resistance.

Polyamides containing free pendant carboxylic groups have been prepared using 3,5-diaminobenzoic acid (DAB) or 4,4'-diaminodiphenic acid (DADP). In U.S. Pat. No. 5,160,619, polyamides containing small amounts of DAB (less than 1 mol %) useful for reverse osmosis membranes are described. In U.S. Pat. No. 5,039,785, polyamides containing more than 10 mol % DADP useful for high performance fibers are described. However, there has been no attempt to crosslink films of these polymers by heating them to temperatures near their $T_g$s. Even if the inventors had attempted to crosslink them in this unexpected manner, in the case of the polymers containing DAB, the carboxylic acid content would have been too low to affect cross linking, and in the case of the DADP polymers, the degree of cross linking would have been so high that the films would have been extremely brittle and unsuitable for flexible substrates.

Thus, it was surprising to find that the incorporation of about 1 mole % to about 10 mole % of a diamine, containing free carboxyl groups, in the copolyamides in this invention could allow the polymers to be crosslinked within a short period of time (minutes) when their films were heated at temperatures close to their $T_g$s. For example, the incorporation of these amounts of DADP or DAB resulted in films resistant to solvents commonly used in the microelectronic industry that had retained their transparency through the crosslinking process. The crosslinked films displayed high glass transition temperatures ($T_g$>300° C.), and low coefficients of thermal expansion (<20 ppm/° C.). Thus, the crosslinked films can be used as flexible substrates that will enable the high temperature fabrication of thin film transistors needed for a wide range of microelectronic applications, particularly for ruggedized or flexible organic light emitting diode (OLED) displays. No available material exhibits all of these properties.

The polymer substrate films in the present invention expand the utilization of AMOLEDs in portable devices by improving device electrical efficiency and the consumer experienced robustness of the display. In addition to the standard OLED display market, the substrate of the present invention will enable the development of the flexible display market. These displays can be used for conformable displays that can be integrated onto clothing, flexible e-paper and e-book displays, displays for smartcards, and a host of other new applications. For example, the polymer substrate films in the present invention can be used for flexible sensors. The new devices produced from the polymer substrate films in the present invention can dramatically impact daily life, by decreasing the cost and increasing accessibility and portability of information.

Additionally, the polymers in the present invention can be prepared in a common organic solvent at room temperature (approximately 15° C. to approximately 25° C.). These polymers can be produced in the absence of an inorganic salt. The resulting colorless and homogenous polymer solution can be used directly for subsequent film casting. No special polymerization reactor and no polymer isolation procedure is required. However, after the polymers are heated at temperatures near their $T_g$s for several minutes, the polymer films are inherently insoluble and chemically resistant to swelling when exposed to inorganic or organic solvents. Thus, the process is amenable to scale-up to metric ton quantities.

The polymers of the present invention are soluble in polar aprotic solvents without the need for the presence of inorganic salts. They can be solution cast in a batch process, or continuously cast directly from their polymerization mixtures and cured using a roll-to-roll process to yield free standing transparent films with thickness greater than 20 µm.

Alternatively, the polymer solutions may be solution cast onto a reinforcing substrate like thin glass or a microelectronic device and cured to form films less than 20 μm. The films display high $T_g$s (>300° C.), low CTEs (<20 ppm/° C.), high transparencies (T>80% between 400 to 750 nm), excellent mechanical properties (tensile strengths>200 MPa), and low moisture absorptions (<2% @ 100% humidity at room temperature). Furthermore, the films show excellent chemical resistance after they are heated to temperatures of at least 90% that of their $T_g$s for short periods of time.

The copolyamides were prepared by polymerizing one or more aromatic diacid dichlorides as shown in the following general structures:

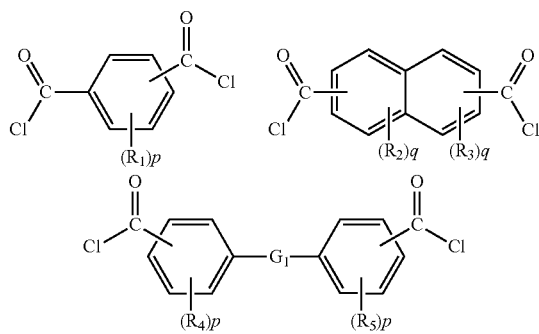

wherein p=4, q=3, and wherein $R_1$, $R_2$, $R_3$, $R_4$, $R_5$ are selected from the group comprising hydrogen, halogen (fluoride, chloride, bromide, and iodide), alkyl, substituted alkyl such as halogenated alkyls, nitro, cyano, thioalkyl, alkoxy, substituted alkoxy such as a halogenated alkoxy, aryl, or substituted aryl such as halogenated aryls, alkyl ester and substituted alkyl esters, and combinations thereof. It is to be understood that each $R_1$ can be different, each $R_2$ can be different, each $R_3$ can be different, each $R_4$ can be different, and each $R_5$ can be different. $G_1$ is selected from a group comprising a covalent bond; a $CH_2$ group; a $C(CH_3)_2$ group; a $C(CF_3)_2$ group; a $C(CX_3)_2$ group, wherein X is a halogen; a CO group; an O atom; a S atom; a $SO_2$ group; a Si $(CH_3)_2$ group; 9,9-fluorene group; substituted 9,9-fluorene; and an OZO group, wherein Z is a aryl group or substituted aryl group, such as phenyl group, biphenyl group, perfluorobiphenyl group, 9,9-bisphenylfluorene group, and substituted 9,9-bisphenylfluorene.

and two or more aromatic diamines as shown in the following general structures:

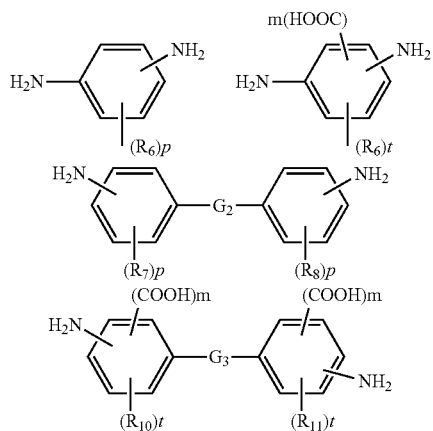

wherein p=4, m=1 or 2, and t=1 to 3, wherein $R_6$, $R_7$, $R_8$, $R_9$, $R_{10}$, $R_{11}$ are selected from the group comprising hydrogen, halogen (fluoride, chloride, bromide, and iodide), alkyl, substituted alkyl such as halogenated alkyls, nitro, cyano, thioalkyl, alkoxy, substituted alkoxy such as a halogenated alkoxy, aryl, substituted aryl such as halogenated aryls, alkyl ester, and substituted alkyl esters, and combinations thereof. It is to be understood that each $R_6$ can be different, each $R_7$ can be different, each $R_8$ can be different, each $R_9$ can be different, each $R_{10}$ can be different, and each $R_{11}$ can be different. $G_2$ and $G_3$ are selected from a group comprising a covalent bond; a $CH_2$ group; a $C(CH_3)_2$ group; a $C(CF_3)_2$ group; a $C(CX_3)_2$ group, wherein X is a halogen; a CO group; an O atom; a S atom; a $SO_2$ group; a Si $(CH_3)_2$ group; 9,9-fluorene group; substituted 9,9-fluorene; and an OZO group, wherein Z is a aryl group or substituted aryl group, such as phenyl group, biphenyl group, perfluorobiphenyl group, 9,9-bisphenylfluorene group, and substituted 9,9-bisphenylfluorene.

DETAILED DESCRIPTION

The present invention is directed toward transparent films prepared from aromatic copolyamides. A polyamide is prepared via a condensation polymerization in a solvent, where the hydrochloric acid generated in the reaction is trapped by a reagent like propylene oxide (PrO). The film can be made directly from the reaction mixture, without the need for isolating and re-dissolving the polyamide. Colorless films can be prepared by casting procedures directly from the polymerization solutions. The product of the reaction of the hydrochloric acid with the PrO is eliminated during the removal of the solvent. These films display low CTEs as cast and do not need to be subjected to stretching. By carefully manipulating the ratio of the monomers used to prepare the copolyamides, the CTEs and $T_g$s of the resulting copolymers and the optical properties of their solution cast films can be controlled. It is particularly surprising that a film can be cured at an elevated temperature when free carboxylic acid side groups exist along the polymer chains. If the reaction of the reagent with the hydrochloric acid does not form volatile products, the polymer is isolated from the polymerization mixture by precipitation and re-dissolved by a polar solvent (without the need for inorganic salts) and cast in the film. If the reaction of the reagent with the hydrochloric acid does form volatile products, the film can be directly cast. One example, above, of a reagent that forms volatile products is PrO.

Representative and illustrative examples of the useful aromatic diacid dichlorides in the invention are:

Terephthaloyl dichloride (TPC);

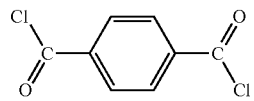

Isophthaloyl dichloride (IPC);

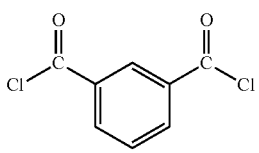 [SMILES: O=C(Cl)c1cccc(C(=O)Cl)c1]

2,6-Naphthaloyl dichloride (NDC);

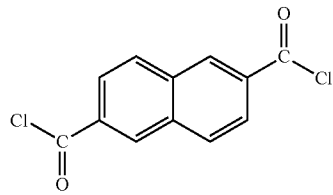 [SMILES: O=C(Cl)c1ccc2cc(C(=O)Cl)ccc2c1]

4,4'-Biphenyldicarbonyl dichloride (BPDC)

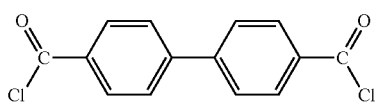

Representative and illustrative examples of the useful aromatic diamines in the invention are:

4,4'-Diamino-2,2'-bistrifluoromethylbenzidine (PFMB)

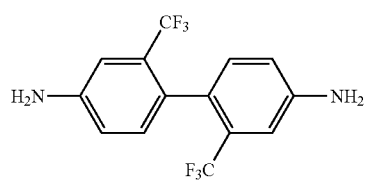

9,9-Bis(4-aminophenyl)fluorene (FDA)

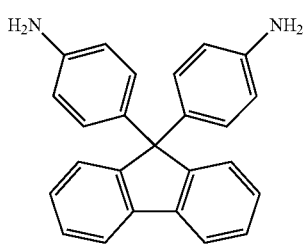 [SMILES: Nc1ccc(C2(c3ccc(N)cc3)c3ccccc3-c3ccccc32)cc1]

9,9-Bis(3-fluoro-4-aminophenyl)fluorene (FFDA)

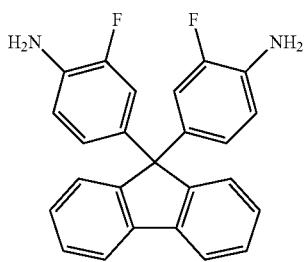 [SMILES: Nc1ccc(C2(c3ccc(N)c(F)c3)c3ccccc3-c3ccccc32)cc1F]

4,4"-Diaminodiphenic acid (DADP)

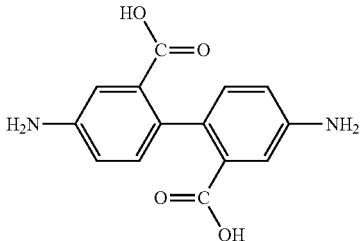 [SMILES: Nc1ccc(-c2ccc(N)cc2C(=O)O)c(C(=O)O)c1]

3,5-Diaminobenzoic acid (DAB)

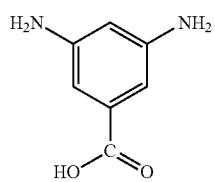 [SMILES: Nc1cc(N)cc(C(=O)O)c1]

4,4'-Diamino-2,2'-bistrifluoromethoxylbenzidine (PFMOB)

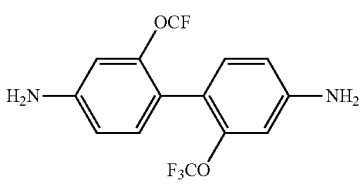

4,4'-Diamino-2,2'-bistrifluoromethyldiphenyl ether (6FODA)

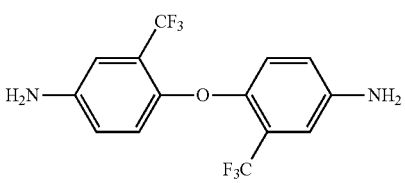 [SMILES: Nc1ccc(Oc2ccc(N)cc2C(F)(F)F)c(C(F)(F)F)c1]

Bis(4-amino-2-trifluoromethylphenyloxyl)benzene (6FOQDA)

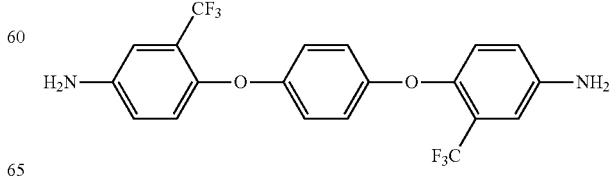

Bis(4-amino-2-trifluoromethylphenyloxyl) biphenyl (6FOBDA)

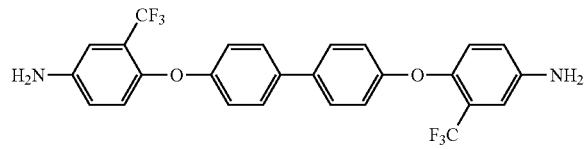

EXAMPLES

Example 1

This Example illustrates the general procedure for the preparation of a copolymer from TPC, IPC and PFMB (70%/30%/100% mol) via solution condensation.

To a 250 ml, three necked, round bottom flask, equipped with a mechanical stirrer, a nitrogen inlet and an outlet, are added PFMB (12024 g, 0.01 mol) and dried DMAc (45 ml). After the PFMB dissolves completely, IPC (0.6395 g 0.003 mol) is added to the solution at room temperature under nitrogen, and the flask wall is washed with DMAc (1.5 ml). After 15 minutes, TPC (1.4211 g, 0.007 is added to the solution, and the flask wall is again washed with DMAc (1.5 ml). The viscosity of the solution increases until the mixture forms a gel. After adding PrO (1.4 g, 0.024 mol), the gel is broken up under stirring to form a viscous, homogenous solution. After stirring at room temperature for another 4 hours, the resulting copolymer solution can be directly cast into film.

Example 2

This Example illustrates the general procedure for the preparation of a copolymer from TPC, PFMB, and FDA (100%/80%/20% mol) via solution condensation.

To a 100 ml, four necked, round bottom flask, equipped with a mechanical stirrer, a nitrogen inlet and outlet, are added PFMB (1.0247 g, 3.2 mmol), FDA (0.02788 g, 0.8 mmol), and dried DMAc (20 ml) at room temperature under nitrogen. After the PFMB dissolves completely, TPC (0.8201 g 4.04 mmol) is added to the solution, and the flask wall is washed with DMAc (5.0 ml). The viscosity of the solution increases until the mixture forms a gel. After adding PrO (0.5 g, 8.5 mmol), the gel is broken up under stirring to form a viscous, homogenous solution. After stirring for another 4 hours at room temperature, the resulting copolymer solution can be directly cast into film.

Example 3

This Example illustrates the general procedure for the preparation of a copolymer from TPC, IPC, DADP, and PFMB (70%/30%/3%/97% mol) via solution condensation.

To a 250 ml, three necked, round bottom flask, equipped with a mechanical stirrer, a nitrogen inlet and outlet, are added PFMB (3.1060 g, 0.0097 mol), DADP (0.0817 g, 0.0003 mol), and dried DMAc (45 ml) at room temperature under nitrogen. After the PFMB dissolves completely, IPC (0.6091 g 0.003 mol) is added to the solution, and the flask wall is washed with DMAc (1.5 ml). After 15 minutes, TPC (1.4211 g, 0.007 mol) is added, and the flask wall is again washed with DMAc (1.5 ml). The viscosity of the solution increases until the mixture forms a gel. After adding PrO (1.4 g, 0.024 mol), the gel is broken up under stirring to form a viscous, homogenous solution. After stirring for another 4 hours at roam temperature, the resulting copolymer solution can be directly cast into film.

Example 4

This Example illustrates the general procedure for the preparation of a copolymer from TPC, IPC, DAB, and PFMB (75%/25%/5%/95% mol) via solution condensation.

To a 250 ml, three necked, round bottom flask, equipped with a mechanical stirrer, a nitrogen inlet and outlet, are added PFMB (10423 g, 0.0095 mol), DAB (0.0761 g, 0.0005 mol), and dried DMAc (45 ml) at room temperature under nitrogen. After the PFMB dissolves completely, IPC (0.5076 g 0.0025 mol) is added to the solution, and the flask wall is washed with DMAc (1.5 ml). After 15 minutes, TPC (1.5227 g, 0.0075 mol) is added, and the flask wall is again washed with DMAc (1.5 ml). The viscosity of the solution increases until the mixture forms a gel. After adding PrO (1.4 g, 0.024 mol), the gel is broken up under stirring to form a viscous, homogenous solution. After stirring for another 4 hours at room temperature, the resulting copolymer solution can be directly cast into film.

It is to be understood, although the temperature provided in the examples is room temperature, the temperature range can be between approximately −20° C. to approximately 50° C., and in some embodiments from approximately 0° C. to approximately 30° C.

Preparation and Characterization of the Polymer Films

The polymer solution can be used directly for the film casting after polymerization. For the preparation of small films in a batch process, the solution is poured on a flat glass plate or other substrate, and the film thickness is adjusted by a doctor blade. After drying on the substrate, under reduced pressure, at 60° C. for several hours, the film is further dried at 200° C. under protection of dry nitrogen flow for 1 hour. The film is cured by heating at or near the polymer $T_g$ under vacuum or in an inert atmosphere for several minutes. Mechanical removal from the substrate yields a free standing film greater than approximately 10 μm thick. The thickness of the free standing films can be adjusted by adjusting the solids content and viscosity of the polymer solution. It is to be understood that the film can be cured at any temperature between approximately 90% and approximately 110% of the $T_g$. It is also understood that the batch process can be modified so that it can be carried out continuously by a roll-to-roll process by techniques known to those skilled in the art.

In one embodiment of this invention, the polymer solution may be solution cast onto a reinforcing substrate like thin glass, silica, or a microelectronic device. In this case, the process is adjusted so that the final polyamide film thickness is greater than approximately 5 μm.

The CTE and $T_g$ are measured with a thermal mechanical analyzer (TA Q 400 TMA). The sample film has a thickness of approximately 20 μm, and the load strain is 0.05N. In one embodiment, the free standing film thickness is between approximately 20 μm and approximately 125 μm. In one embodiment, the film is adhered to a reinforcing substrate and the film thickness is <20 μm. In one embodiment, the CTE is less than approximately 20 ppm/° C., but it is understood that in other embodiments, the CTE is less than approximately 15 ppm/° C., less than approximately 10 ppm/° C., and less than approximately 5 ppm/° C. It is to be understood that within these embodiments the CTE can be less than approximately 19, 18, 17, 16, 15, 14, 13, 12, 11, 10, 9, 8, 7, 6, or 5 ppm/° C. The experimentally derived CTEs are the average of the CTE obtained from room temperature to about 250° C.

Film transparency is measured by determining the transmittance of a 10 μm thick film from 400 to 750 nm with a UV-Visible spectrometer (Shimadzu UV 2450).

The solvent resistance of the film is determined by immersing it in a selected solvent for 30 minutes at room temperature. The film is considered solvent resistant if it is substantially free of surface wrinkles, swelling, or any other visible damage after immersion. The films are useful as substrates for flexible electronic devices.

To determine the ratio of reactants necessary to obtain a soluble copolyamide that can be solution cast into a colorless film with a $T_g$>300 C, a CTE <20 ppm, and a transmittance >80% from 400 to 750 nm, a preliminary study can be conducted where the amount of reactants that do not contain free carboxyl groups are varied in a systematic manner. The properties of the films of the copolymers obtained are measured in order to determine suitable copolymer candidates (base polymers) for the incorporation of free carboxyl groups. Such studies are well understood by those skilled in the art. The following tables show comparative examples of the such studies used to determine some on the base polymers utilized in the present invention.

TABLE 1

Properties of films based on TPC/IPC/PFMB

| TPC/IPC/PFMB | CTE ppm/° C. | $T_g$ ° C. | Film Transparency |
|---|---|---|---|
| 100/0/100 | — | — | Opaque |
| 90/10/100 | — | — | Opaque |
| 80/20/100 | — | — | Opaque |
| 75/25/100 | — | — | Opaque |
| 70/30/100 (Example 1) | 7.4 | 336 | Clear |
| 60/40/100 | 8.0 | 323 | Clear |
| 50/50/100 | 12.2 | 330 | Clear |
| 40/60/100 | 22.4 | 336 | Clear |
| 30/70/100 | 32.6 | 319 | Clear |
| 20/80/100 | 27.9 | 326 | Clear |
| 10/90/100 | 30.1 | 325 | Clear |
| 0/100/100 | 34.2 | 327 | Clear |

TABLE 2

Properties of films based on TPC/FDA/PFMB

| TPC/FDA/PFMB | CTE ppm/° C. | $T_g$ ° C. | Film Transparency |
|---|---|---|---|
| 100/0/100 | — | — | Opaque |
| 100/10/90 | — | — | Opaque |
| 100/20/80 (Example 2) | 5.8 | 365 | Clear |
| 100/30/70 | 5.1 | 370 | Clear |
| 100/50/50 | 13.1 | 391 | Clear |
| 100/70/30 | 18.3 | 406 | Clear |
| 100/80/20 | 26.7 | 404 | Clear |
| 100/90/10 | 33.2 | 410 | Clear |
| 100/100/0 | >40 | >410 | Clear |

To determine the minimum amount of carboxyl groups necessary to thermally crosslink the copolymer without significantly changing the properties, a second preliminary study can be conducted where various amounts of a reactant containing free carboxyl groups are copolymerized with the mixture of reactants used to prepare the base polymer. Films of the copolymers obtained and their properties determined. For example, various amounts of DADP were copolymerized with the reactants used in the preparation of the base polymer made from a mixture of TPC, IPC and PFMB in a 70/30/100 ratio (Example 1). The films of the copolymers obtained containing DADP were thermally treated at 330° C. for 5 minutes. After curing, the film resistance to NMP was evaluated. The results are shown in Table 3.

TABLE 3

NMP resistance test for TPC/IPC/PFMB/DADP polymer films

| TPC/IPC/PFMB/DADP | NMP resistance |
|---|---|
| 70/30/99/1 | No |
| 70/30/97/3 (Example 3) | Yes |
| 70/30/95/5 | Yes |

The properties of polymer films based on Example 3 after curing are shown in Table 4. The composition of a copolymer containing DAB (Example 4), which was determined in an analogous manner, is also shown in Table 4 along with the properties of cured films of this polymer.

TABLE 4

Properties of films after curing

|  | Example 3 | Example 4 |
|---|---|---|
| TPC | 70 | 75 |
| IPC | 30 | 25 |
| PFMB | 97 | 95 |
| DADP | 3 | 0 |
| DAB | 0 | 5 |
| Curing Conditions | 330° C. × 5 minutes | 330° C. × 10 minutes |
| $T_g$ (° C.) | 334 | 350 |
| CTE (ppm/° C.) | 7 | 12 |
| T % at 400 nm | 80 | 81 |
| DMAc resistance | Yes | Yes |
| NMP resistance | Yes | Yes |
| DMSO resistance | Yes | Yes |

The cured films of this invention are resistant to both inorganic and organic solvents. The film solvent resistance can be evaluated quickly by analyzing the resistance to NMP, a commonly used strong solvent. It has been found that films resistant to this solvent are also resistant to other polar solvents.

The following are exemplary polymers that can be used in this invention—1) about 50 to about 70 mol % TPC, about 30 to about 50 mol % IPC, about 90 to about 99 mol % PFMB, and about 1 to about 10 mol % 4,4'-Diaminodiphenic acid (DADP); 2) about 50 to about 70 mol % TPC, about 25 to about 50 mol % IPC, about 90 to about 96 mol % PFMB, and about 4 to about 10 mol % 3,5-diaminobenzoic acid (DAB); 3) about 100 mol % TPC, about 25 to about 85 mol % PFMB, about 15 to about 50 mol % 9,9-Bis(4-aminophenyl)fluorine (FDA), and about 1 to about 10 mol % DADP; and 4) about 100 mol % TPC, about 50 to about 85 mol % PFMB, about 15 to about 50 mol % FDA, and about 4 to about 10 mol % DAB.

The embodiments have been described, hereinabove. It will be apparent to those skilled in the art that the above methods and apparatuses may incorporate changes and modifications without departing from the general scope of this invention. It is intended to include all such modifications and alterations insofar as they come within the scope of the appended claims or the equivalents thereof. Although the description above contains much specificity, this should not be construed as limiting the scope of the invention, but as merely providing illustrations of some of the embodiments of this invention. Various other embodiments and ramifications are possible within its scope.

Furthermore, notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Having thus described the invention, it is now claimed:

1. A polymer solution capable of being made into transparent films; wherein the polymer solution comprises an aromatic copolyamide that is soluble in polar aprotic solvents, is capable of being thermally crosslinked, and has one or more repeat units of general formula (I) and one or more repeat units of general formula (II), the general formulas (I) and (II) having the following structures:

$$\left[ -\overset{O}{\underset{\|}{C}} -Ar_1 -\overset{O}{\underset{\|}{C}} -NH -Ar_2 -NH \right]_X - * \quad (I)$$

$$* -\left[ -\overset{O}{\underset{\|}{C}} -Ar_1 -\overset{O}{\underset{\|}{C}} -NH -\underset{\underset{(COOH)n}{|}}{Ar_3} -NH \right]_Y - * \quad (II)$$

wherein n=1 to 3;
wherein X and Y are molar ratios of the repeat units (I) and (II) and X is from 0.90 to 0.98 and Y is from 0.10 to 0.02, respectively;
wherein $Ar_1$ is selected from the group consisting of:

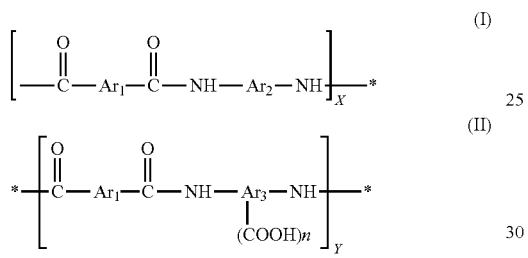

wherein p=1 to 4 and q=1 to 3, and wherein $R_1$, $R_2$, $R_3$, $R_4$, $R_5$ are selected from the group consisting of hydrogen, halogen, alkyl, substituted alkyl, nitro, cyano, thioalkyl, alkoxy, substituted alkoxy, aryl, or substituted aryl, alkyl ester and substituted alkyl esters, and combinations thereof, wherein $G_1$ is selected from the group consisting of a covalent bond; a $CH_2$ group; a $C(CH_3)_2$ group; a $C(CF_3)_2$ group; a $C(CX_3)_2$ group, wherein X is a halogen; a CO group; an O atom; a S atom; a $SO_2$ group; a Si $(CH_3)_2$ group; 9, 9-fluorene group; substituted 9, 9-fluorene; and an OZO group, wherein Z is an aryl group or substituted aryl group selected from the group consisting of a phenyl group, biphenyl group, perfluorobiphenyl group, 9, 9-bisphenylfluorene group, and substituted 9, 9-bisphenylfluorene; wherein when p is less than 4 or q is less than 3 the remaining positions on the aromatic ring are assumed by hydrogen atoms; and
wherein at least one of the $Ar_1$ groups in at least one of the repeat units (I) or at least one of the repeat units (II) is selected from the group consisting of:

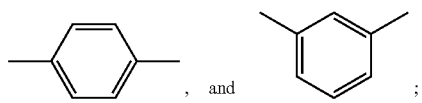

wherein $Ar_2$ is selected from the group consisting of:

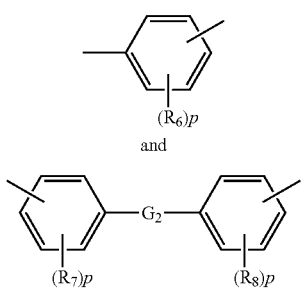

wherein p=1 to 4, wherein $R_6$, $R_7$, $R_8$ are selected from the group consisting of hydrogen, halogen, alkyl, substituted alkyl, nitro, cyano, thioalkyl, alkoxy, substituted alkoxy, substituted aryl, alkyl ester, and substituted alkyl esters, and combinations thereof, wherein $G_2$ is selected from the group consisting of a covalent bond; a $CH_2$ group; a $C(CH_3)_2$ group; a $C(CF_3)_2$ group; a $C(CX_3)_2$ group, wherein X is a halogen; a CO group; an O atom; a S atom; a $SO_2$ group; a Si $(CH_3)_2$ group; 9, 9-fluorene group; substituted 9, 9-fluorene; and an OZO group, wherein Z is a aryl group or substituted aryl group selected from the group consisting of a phenyl group, biphenyl group, perfluorobiphenyl group, 9, 9-bisphenylfluorene group, and substituted 9, 9-bisphenylfluorene; wherein when p is less than 4 the other positions on the aromatic ring are assumed by hydrogen atoms; and
wherein at least one of the $Ar_2$ groups in at least one of the repeat units (I) is selected from the group consisting of:

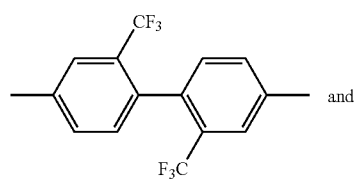

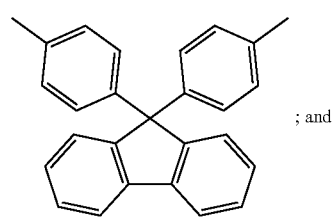

wherein Ar₃ is selected from the group consisting of:

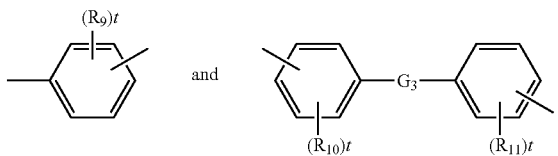

wherein t=1 to 3, wherein $R_9$, $R_{10}$, $R_{11}$ are selected from the group consisting of hydrogen, halogen, alkyl, substituted alkyl, nitro, cyano, thioalkyl, alkoxy, substituted alkoxy, aryl, substituted aryl, alkyl ester, carboxyl, and substituted alkyl esters, and combinations thereof, wherein $G_3$ is selected from the group consisting of a covalent bond; a $CH_2$ group; a $C(CH_3)_2$ group; a $C(CF_3)_2$ group; a $C(CX_3)_2$ group, wherein X is a halogen; a CO group; an O atom; a S atom; a $SO_2$ group; a Si $(CH_3)_2$ group; 9, 9-fluorene group; substituted 9, 9-fluorene; and an OZO group, wherein Z is a aryl group or substituted aryl group selected from the group consisting of a phenyl group, biphenyl group, perfluorobiphenyl group, 9, 9-bisphenylfluorene group, and substituted 9, 9-bisphenylfluorene; wherein when t is less than 3, the remaining positions on the aromatic ring are assumed by hydrogen atoms; and wherein at least one $Ar_3$ group in at least one of the repeat units (II) is selected from the group consisting of:

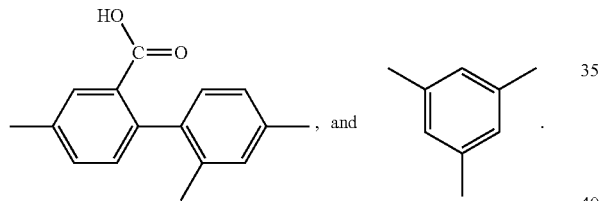

2. The polymer solution of claim 1, wherein the copolyamide contains more than one repeat units with structures (I) or (II), where $Ar_1$, $Ar_2$, and $Ar_3$ are the same or different in each repeat unit (I) and each repeat unit (II).

3. The polymer solution of claim 1, wherein the polymer solution is solution cast into a film that has a film transparency of >80% between 400 nm and 750 nm.

4. A transparent copolyamide film prepared by casting the polymer solution of claim 1 and heating the resulting copolyamide film until it will no longer dissolve or swell in polar aprotic organic solvents.

5. The transparent copolyamide film of claim 4, wherein the transparent copolyamide film has a coefficient of thermal expansion that is less than approximately 20 ppm/° C.

6. The transparent copolyamide film of claim 4, wherein the transparent copolyamide film is heated at approximately 300° C. or higher for approximately 3 minutes or longer.

7. The transparent copolyamide film of claim 4, wherein the transparent copolyamide film has a transparency that is >80% between 400 nm and 750 nm.

8. The transparent copolyamide film of claim 7, wherein the transparent copolyamide film has a thickness of approximately 10 μm or more.

9. The transparent copolyamide film of claim 7, wherein the transparent copolyamide film is adhered to a substrate and wherein the transparent copolyamide film has a thickness that is greater than approximately 5 μm.

10. The transparent copolyamide film of claim 9, wherein the substrate is a glass film with a thickness greater than approximately 25 μm.

11. A transparent film formed from a polymer solution comprising an aromatic copolyamide that is soluble in polar aprotic solvents, is capable of being thermally crosslinked at approximately 300° C. or higher, and has one or more repeat units of general formula (I) and one or more repeat units of general formula (II), the general formulas (I) and (II) having the following structures:

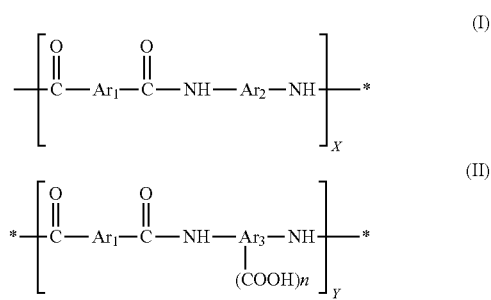

wherein n=1 to 3;
wherein X and Y are molar ratios of the repeat units (I) and (II) and X is from 0.90 to 0.98 and Y is from 0.10 to 0.02, respectively;
wherein $Ar_1$ is selected from the group consisting of:

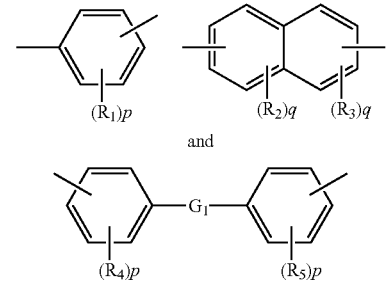

wherein p=1 to 4 and q=1 to 3, and wherein $R_1$, $R_2$, $R_3$, $R_4$, $R_5$ are selected from the group consisting of hydrogen, halogen, alkyl, substituted alkyl, nitro, cyano, thioalkyl, alkoxy, substituted alkoxy, aryl, or substituted aryl, alkyl ester and substituted alkyl esters, and combinations thereof, wherein $G_1$ is selected from the group consisting of a covalent bond; a $CH_2$ group; a $C(CH_3)_2$ group; a $C(CF_3)_2$ group; a $C(CX_3)_2$ group, wherein X is a halogen; a CO group; an O atom; a S atom; a $SO_2$ group; a Si $(CH_3)_2$ group; 9, 9-fluorene group; substituted 9, 9-fluorene; and an OZO group, wherein Z is an aryl group or substituted aryl group selected from the group consisting of a phenyl group, biphenyl group, perfluorobiphenyl group, 9, 9-bisphenylfluorene group, and substituted 9, 9-bisphenylfluorene; wherein when p is less than 4 or q is less than 3 the remaining positions on the aromatic ring are assumed by hydrogen atoms; and wherein at least one of the $Ar_1$ groups in at least one of the repeat units (I) or at least one of the repeat units (II) is selected from the group consisting of:

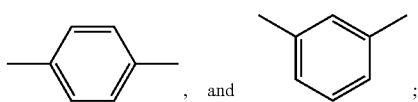

wherein Ar$_2$ is selected from the group consisting of:

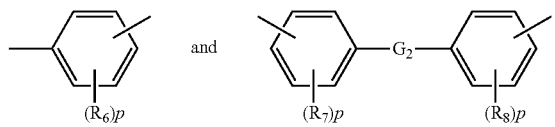

wherein p=1 to 4, wherein R$_6$, R$_7$, R$_8$ are selected from the group consisting of hydrogen, halogen, alkyl, substituted alkyl, nitro, cyano, thioalkyl, alkoxy, substituted alkoxy, substituted aryl, alkyl ester, and substituted alkyl esters, and combinations thereof, wherein G$_2$ is selected from the group consisting of a covalent bond; a CH$_2$ group; a C(CH$_3$)$_2$ group; a C(CF$_3$)$_2$ group; a C(CX$_3$)$_2$ group, wherein X is a halogen; a CO group; an O atom; a S atom; a SO$_2$ group; a Si (CH$_3$)$_2$ group; 9, 9-fluorene group; substituted 9, 9-fluorene; and an OZO group, wherein Z is a aryl group or substituted aryl group selected from the group consisting of a phenyl group, biphenyl group, perfluorobiphenyl group, 9, 9-bisphenylfluorene group, and substituted 9, 9-bisphenylfluorene; wherein when p is less than 4 the other positions on the aromatic ring are assumed by hydrogen atoms; and wherein at least one of the Ar$_2$ groups in at least one of the repeat units (I) is selected from the group consisting of:

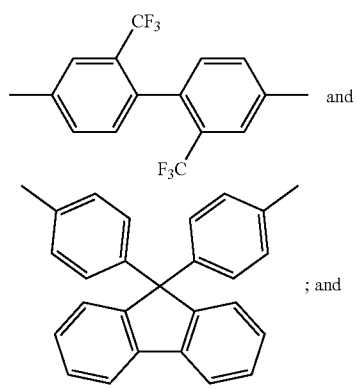

wherein Ar$_3$ is selected from the group consisting of:

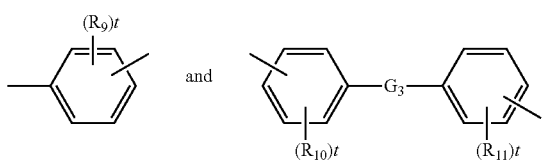

wherein t=1 to 3, wherein R$_9$, R$_{10}$, R$_{11}$ are selected from the group consisting of hydrogen, halogen, alkyl, substituted alkyl, nitro, cyano, thioalkyl, alkoxy, substituted alkoxy, aryl, substituted aryl, alkyl ester, carboxyl, and substituted alkyl esters, and combinations thereof, wherein G$_3$ is selected from the group consisting of a covalent bond; a CH$_2$ group; a C(CH$_3$)$_2$ group; a C(CF$_3$)$_2$ group; a C(CX$_3$)$_2$ group, wherein X is a halogen; a CO group; an O atom; a S atom; a SO$_2$ group; a Si (CH$_3$)$_2$ group; 9, 9-fluorene group; substituted 9, 9-fluorene; and an OZO group, wherein Z is a aryl group or substituted aryl group selected from the group consisting of a phenyl group, biphenyl group, perfluorobiphenyl group, 9, 9-bisphenylfluorene group, and substituted 9, 9-bisphenylfluorene; wherein when t is less than 3, the remaining positions on the aromatic ring are assumed by hydrogen atoms; and wherein at least one Ar$_3$ group in at least one of the repeat units (II) is selected from the group consisting of:

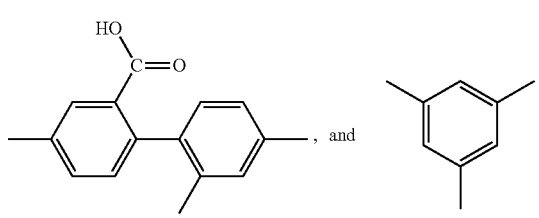

12. The transparent film of claim 11, wherein the copolyamide contains more than one repeat units with structures (I) or (II), where Ar$_1$, Ar$_2$, and Ar$_3$ are the same or different in each repeat unit (I) and each repeat unit (II).

13. The transparent film of claim 11, wherein the transparent film has a transparency of >80% between 400 nm and 750 nm.

14. The transparent film of claim 11, wherein the transparent film is heated until it will no longer dissolve or swell in polar aprotic organic solvents.

15. The transparent film of claim 14, wherein the transparent film is heated at approximately 300° C. or higher for approximately 3 minutes or longer.

16. The transparent film of claim 14, wherein the transparent film has a transparency >80% between 400 and 750 nm.

17. The transparent film of claim 14, wherein the transparent film has a thickness of approximately 10 μm or more.

18. The transparent film of claim 14, wherein the transparent film is adhered to a substrate and wherein the transparent film has a thickness that is greater than approximately 5 μm.

19. The transparent film of claim 18, wherein the substrate is a glass film with a thickness greater than approximately 25 μm.

20. The transparent film of claim 14, wherein the transparent film has an average coefficient of thermal expansion that is less than approximately 20 ppm/° C. between 100 and 200° C.

21. An aromatic copolyamide, wherein the aromatic copolyamide is soluble in polar aprotic solvents, is capable of being thermally crosslinked, has a glass transition temperature of at least 300° C., and has one or more repeat units of general formulas (I) and one or more repeat units of general formula (II), the general formulas (I) and (II) having the following structures:

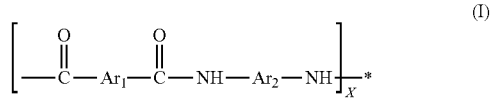

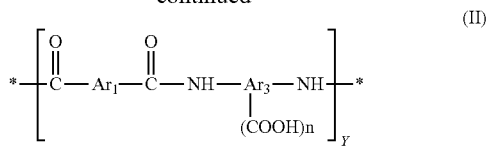

(II)

wherein n=1 to 3;
wherein X and Y are molar ratios of the repeat units (I) and (II) and X is from 0.90 to 0.98 and Y is from 0.10 to 0.02, respectively;
wherein $Ar_1$ is selected from the group consisting of:

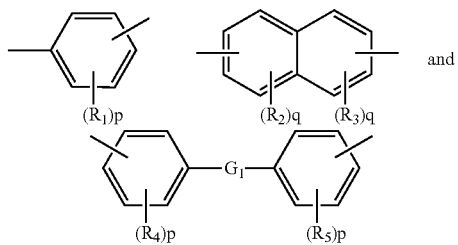

wherein p=1 to 4 and q=1 to 3, and wherein $R_1$, $R_2$, $R_3$, $R_4$, $R_5$ are selected from the group consisting of hydrogen, halogen, alkyl, substituted alkyl, nitro, cyano, thioalkyl, alkoxy, substituted alkoxy, aryl, or substituted aryl, alkyl ester and substituted alkyl esters, and combinations thereof, wherein $G_1$ is selected from the group consisting of a covalent bond; a $CH_2$ group; a $C(CH_3)_2$ group; a $C(CF_3)_2$ group; a $C(CX_3)_2$ group, wherein X is a halogen; a CO group; an O atom; a S atom; a $SO_2$ group; a Si $(CH_3)_2$ group; 9, 9-fluorene group; substituted 9, 9-fluorene; and an OZO group, wherein Z is an aryl group or substituted aryl group selected from the group consisting of a phenyl group, biphenyl group, perfluorobiphenyl group, 9, 9-bisphenylfluorene group, and substituted 9, 9-bisphenylfluorene; wherein when p is less than 4 or q is less than 3 the remaining positions on the aromatic ring are assumed by hydrogen atoms; and
wherein at least one of the $Ar_1$ groups in at least one of the repeat units (I) or at least one of the repeat units (II) is selected from the group consisting of:

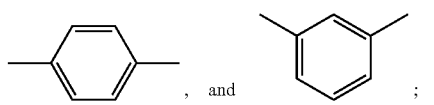

wherein $Ar_2$ is selected from the group consisting of:

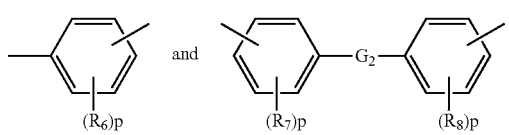

wherein p=1 to 4, wherein $R_6$, $R_7$, $R_8$ are selected from the group consisting of hydrogen, halogen, alkyl, substituted alkyl, nitro, cyano, thioalkyl, alkoxy, substituted alkoxy, substituted aryl, alkyl ester, and substituted alkyl esters, and combinations thereof, wherein $G_2$ is selected from the group consisting of a covalent bond; a $CH_2$ group; a $C(CH_3)_2$ group; a $C(CF_3)_2$ group; a $C(CX_3)_2$ group, wherein X is a halogen; a CO group; an O atom; a S atom; a $SO_2$ group; a Si $(CH_3)_2$ group; 9, 9-fluorene group; substituted 9, 9-fluorene; and an OZO group, wherein Z is a aryl group or substituted aryl group selected from the group consisting of a phenyl group, biphenyl group, perfluorobiphenyl group, 9, 9-bisphenylfluorene group, and substituted 9, 9-bisphenylfluorene; wherein when p is less than 4 the other positions on the aromatic ring are assumed by hydrogen atoms; and
wherein at least one of the $Ar_2$ groups in at least one of the repeat units (I) is selected from the group consisting of:

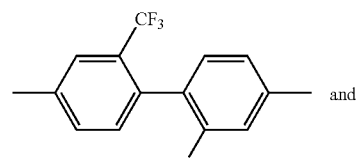

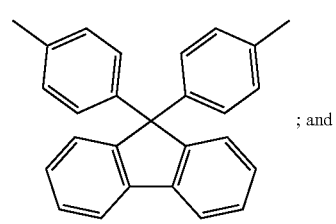

wherein $Ar_3$ is selected from the group consisting of:

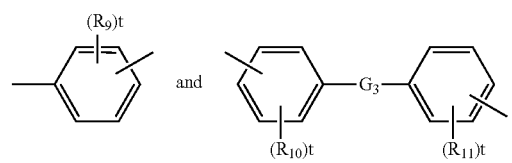

wherein t=1 to 3, wherein $R_9$, $R_{10}$, $R_{11}$ are selected from the group consisting of hydrogen, halogen, alkyl, substituted alkyl, nitro, cyano, thioalkyl, alkoxy, substituted alkoxy, aryl, substituted aryl, alkyl ester, carboxyl, and substituted alkyl esters, and combinations thereof, wherein $G_3$ is selected from the group consisting of a covalent bond; a $CH_2$ group; a $C(CH_3)_2$ group; a $C(CF_3)_2$ group; a $C(CX_3)_2$ group, wherein X is a halogen; a CO group; an O atom; a S atom; a $SO_2$ group; a Si $(CH_3)_2$ group; 9, 9-fluorene group; substituted 9, 9-fluorene; and an OZO group, wherein Z is a aryl group or substituted aryl group selected from the group consisting of a phenyl group, biphenyl group, perfluorobiphenyl group, 9, 9-bisphenylfluorene group, and substituted 9, 9-bisphenylfluorene; wherein when t is less than 3, the remaining positions on the aromatic ring are assumed by hydrogen atoms; and wherein at least one Ar₃ group in at least one of the repeat units (II) is selected from the group consisting of:
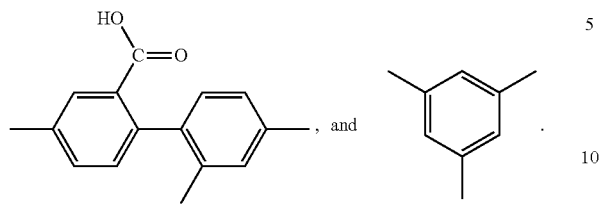
22. The aromatic copolyamide of claim 21, wherein the copolyamide contains more than one repeat units with structures (I) or (II), where Ar₁, Ar₂, and Ar₃ are the same or different in each repeat unit (I) and each repeat unit (II).
* * * * *